(12) United States Patent
Fu et al.

(10) Patent No.: US 12,128,309 B2
(45) Date of Patent: Oct. 29, 2024

(54) VIRTUAL OBJECT CONTROL METHOD AND APPARATUS, TERMINAL, AND STORAGE MEDIUM

(71) Applicant: TENCENT TECHNOLOGY (SHENZHEN) COMPANY LIMITED, Shenzhen (CN)

(72) Inventors: Yuan Fu, Shenzhen (CN); Fan Luo, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 269 days.

(21) Appl. No.: 17/554,556

(22) Filed: Dec. 17, 2021

(65) Prior Publication Data

US 2022/0105432 A1    Apr. 7, 2022

Related U.S. Application Data

(63) Continuation of application No. PCT/CN2021/080852, filed on Mar. 15, 2021.

(30) Foreign Application Priority Data

Apr. 28, 2020  (CN) .......................... 202010352292.0

(51) Int. Cl.
*A63F 13/56* (2014.01)
*A63F 13/426* (2014.01)
*A63F 13/58* (2014.01)

(52) U.S. Cl.
CPC ............ *A63F 13/56* (2014.09); *A63F 13/426* (2014.09); *A63F 13/58* (2014.09); *A63F 2300/1075* (2013.01)

(58) Field of Classification Search
CPC ........ A63F 13/56; A63F 13/426; A63F 13/58; A63F 2300/1075
See application file for complete search history.

(56) References Cited

U.S. PATENT DOCUMENTS 5,376,946 A * 12/1994 Mikan .................... G06F 3/038
345/157
10,078,410 B1    9/2018 Isaak et al.
(Continued)

FOREIGN PATENT DOCUMENTS

CN    107930105 A    4/2018
CN    108037888 A *  5/2018    ........... A63F 13/426
(Continued)

OTHER PUBLICATIONS

The World Intellectual Property Organization (WIPO) International Search Report for PCT/CN2021/080852 Jun. 23, 2021 6 Pages (including translation).
(Continued)

*Primary Examiner* — Werner G Garner
(74) *Attorney, Agent, or Firm* — ANOVA LAW GROUP, PLLC

(57) ABSTRACT

A virtual object control method is provided. The method includes: displaying a user interface, the user interface including a virtual object and a displacement control; receiving a first operation signal corresponding to the displacement control; controlling, based on the first operation signal, the virtual object to perform a first displacement operation; and controlling, in response to a second operation signal corresponding to the displacement control being received in a process of performing the first displacement operation by the virtual object, the virtual object to perform a second displacement operation based on the second operation signal after the first displacement operation is performed.

20 Claims, 9 Drawing Sheets

(56) References Cited

U.S. PATENT DOCUMENTS

| | | | |
|---|---|---|---|
| 10,603,589 | B2 | 3/2020 | Miyamoto et al. |
| 2011/0172013 | A1 | 7/2011 | Shirasaka et al. |
| 2015/0033143 | A1 | 1/2015 | Lee |
| 2016/0016079 | A1 | 1/2016 | Kuroume et al. |
| 2018/0024660 | A1 | 1/2018 | Wang |
| 2019/0265882 | A1 | 8/2019 | Nakahara |
| 2020/0282308 | A1 | 9/2020 | Guo et al. |
| 2020/0398151 | A1 | 12/2020 | Zhang et al. |
| 2020/0406131 | A1 | 12/2020 | Benson et al. |
| 2021/0016172 | A1 | 1/2021 | Huang et al. |

FOREIGN PATENT DOCUMENTS

| | | | |
|---|---|---|---|
| CN | 108037952 A | | 5/2018 |
| CN | 108379843 A | | 8/2018 |
| CN | 108379844 A | | 8/2018 |
| CN | 108434730 A | | 8/2018 |
| CN | 108525296 A | | 9/2018 |
| CN | 108579077 A | | 9/2018 |
| CN | 109260702 A | | 1/2019 |
| CN | 109568956 A | | 4/2019 |
| CN | 109568965 A | | 4/2019 |
| CN | 109646943 A | | 4/2019 |
| CN | 109847370 A | | 6/2019 |
| CN | 110538452 A | | 12/2019 |
| CN | 110997088 A | | 4/2020 |
| CN | 111589135 A | | 8/2020 |
| JP | 2011141632 A | | 7/2011 |
| JP | 2017153854 A | | 9/2017 |
| JP | 2018068781 A | | 5/2018 |
| JP | 2018102909 A | | 7/2018 |
| KR | 20180005222 A | | 1/2018 |
| KR | 20190057381 A | | 5/2019 |

OTHER PUBLICATIONS

The State Intellectual Property Office of the People's Republic of China (SIPO) Office Action 1 for 202010352292.0 Apr. 1, 2021 12 Pages (including translation).

The State Intellectual Property Office of the People's Republic of China (SIPO) Office Action 2 for 202010352292.0 Oct. 29, 2021 10 Pages (including translation).

Intellectual Property Office of Singapore The Search Report for 11202112156V May 12, 2023 2 Pages.

The Japan Patent Office (JPO) Notification of Reasons for Refusal for Application No. 2021-564715 and Translation Dec. 19, 2022 6 Pages.

Collapse 3rd Cheats, Explain the basic operations to enjoy exhilarating action! ,smartphone, Feb. 15, 2018, https://app.famitsu.com/20180215_1238389/, Searched Dec. 18, 2022.

Korean Intellectual Property Office (KIPO) Request for the Submission of an Opinionfor 10-2021-7038156 Nov. 16, 2023 23 Pages (including translation).

Perfect Use of Mini Map | Map Awareness & Farming Guide | Mobile Legends Bang Bang', yoo tube moving picture notice material, (Mar. 24, 2019) https: / / wwwyoutube. com. / watch.

"A King's Required Course"12_Teach you Han Xin's seamless combo to sweep through thousands of troops! BiliBili video post, Sep. 28, 2016 (Sep. 18, 2016). <https://www.bilibili.com/video/BV1Us411t792/? vd_source=5721e8c136869c554f467e59deab722e>.

Korean Intellectual Property Office (KIPO) Office Action 1 for 2021-7038156 Jul. 11, 2024 13 Pages (including translation).

* cited by examiner

VIRTUAL OBJECT CONTROL METHOD AND APPARATUS, TERMINAL, AND STORAGE MEDIUM

RELATED APPLICATION(S)

This application is a continuation application of PCT Patent Application No. PCT/CN2021/080852 filed on Mar. 15, 2021, which claims priority to Chinese Patent Application No. 202010352292.0, entitled "VIRTUAL OBJECT CONTROL METHOD AND APPARATUS, TERMINAL, AND STORAGE MEDIUM", and filed on Tuesday, Apr. 28, 2020, all of which are incorporated herein by reference in entirety.

FIELD OF THE TECHNOLOGY

The present disclosure relates to the field of application program development technologies, and in particular, to a virtual object control method and apparatus, a terminal, and a storage medium.

BACKGROUND

In a multiplayer online battle arena (MOBA) game, it may become desirable to control a virtual object to displace, for example, jump or teleport from a position to another position.

When it is desirable to control a virtual object to perform a multi-segment displacement operation, only after the virtual object has performed a segment of displacement, a user can perform an operation, to control the virtual object to perform a next segment of displacement. When the user controls the virtual object to perform the multi-segment displacement, the user may need to perform operation control at intervals. As a result, the virtual object performs a displacement operation at relatively low efficiency, and consequently an interaction effect of a computer is relatively poor.

SUMMARY

Embodiments of the present disclosure provide a virtual object control method and apparatus, a terminal, and a storage medium, to improve efficiency at which a virtual object performs a displacement operation, and further improve an interaction effect of a computer. The technical solutions are as follows:

In one aspect, the present disclosure provides a virtual object control method, performed by a terminal, the method including: displaying a user interface, the user interface including a virtual object and a displacement control; and the displacement control being used for controlling the virtual object to cast a displacement skill; receiving a first operation signal corresponding to the displacement control; controlling, based on the first operation signal, the virtual object to perform a first displacement operation; and controlling, in response to a second operation signal corresponding to the displacement control being received in a process of performing the first displacement operation by the virtual object, the virtual object to perform a second displacement operation based on the second operation signal after the first displacement operation is performed.

In another aspect, the present disclosure provides a virtual object control apparatus, the apparatus including a memory storing computer program instructions; and a processor coupled to the memory and configured to execute the computer program instructions and perform: displaying a user interface, the user interface including a virtual object and a displacement control; and the displacement control being used for controlling the virtual object to cast a displacement skill; receiving a first operation signal corresponding to the displacement control; and controlling, based on the first operation signal, the virtual object to perform a first displacement operation, controlling, in response to a second operation signal corresponding to the displacement control being received by the signal receiving module in a process of performing the first displacement operation by the virtual object, the virtual object to perform a second displacement operation based on the second operation signal after the first displacement operation is performed.

In yet another aspect, the present disclosure provides a non-transitory computer-readable storage medium storing computer program instructions executable by at least one processor to perform: displaying a user interface, the user interface including a virtual object and a displacement control; and the displacement control being used for controlling the virtual object to cast a displacement skill; receiving a first operation signal corresponding to the displacement control; controlling, based on the first operation signal, the virtual object to perform a first displacement operation; and controlling, in response to a second operation signal corresponding to the displacement control being received in a process of performing the first displacement operation by the virtual object, the virtual object to perform a second displacement operation based on the second operation signal after the first displacement operation is performed.

The technical solutions provided in the embodiments of the present disclosure may include the following beneficial effects:

In a process of performing a first displacement operation by a virtual object, a second displacement operation that the virtual object is controlled to perform after the first displacement operation is performed is determined. Compared with a situation that time is spent in determining the subsequent second displacement operation after the first displacement operation is performed, in the technical solutions provided in the embodiments of the present disclosure, the second displacement operation is determined by using time in this process in which the virtual object performs the first displacement operation, to save an interval time between the first displacement operation and the second displacement operation, so that a seamless connection may be implemented between the first displacement operation and the second displacement operation, thereby improving efficiency at which the virtual object performs displacement operations, and further improving an interaction effect of a computer.

The foregoing general descriptions and the following detailed descriptions are merely exemplary and explanatory, and are not intended to limit the present disclosure.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

Throughout the description, and when applicable, "some embodiments" or "certain embodiments" describe subsets of all possible embodiments, but it may be understood that the "some embodiments" or "certain embodiments" may be the same subset or different subsets of all the possible embodiments, and can be combined with each other without conflict.

In certain embodiments, the term "based on" is employed herein interchangeably with the term "according to."

An embodiment of the present disclosure provides a terminal, the terminal is an electronic device having data computing, processing and storage capabilities, and a target application program is run on the terminal. The terminal may be a smartphone, a tablet computer, a personal computer (PC), a wearable device, or the like. In certain embodiments, the terminal is a mobile terminal device having a touch display screen, and a user can implement man-machine interaction through the touch display screen. The target application program may be a game application program, for example, a MOBA game application program. The MOBA game application program is a game application program in which users of two teams perform contention between the teams. In addition to the MOBA game application program, the target application program may alternatively be a shooting game application program, a multi-player shooting survival game application program, a battle royale game application program, a location based service (LBS) game application program or another type of game application program. This is not limited in the embodiments of the present disclosure.

In some other examples, the target application program may alternatively be an application program other than the game application program, for example, a social application program, a payment application program, a video application program, a music application program, a shopping application program, a news application program, or another application program provided with a virtual object displacement control action. This is not limited in the embodiments of the present disclosure.

In a method provided in the embodiments of the present disclosure, steps may be performed by the terminal. For example, the terminal may be a client on which the target application program is run.

The technical solutions provided in the present disclosure are described below by using several embodiments.

Figure 1:
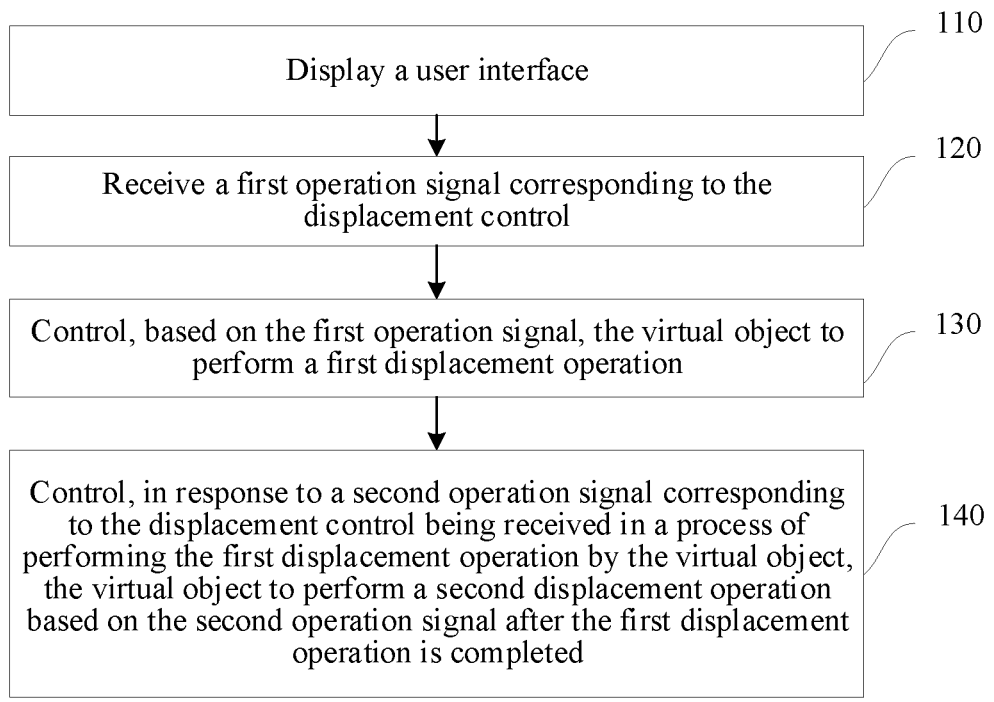
FIG. 1 is a schematic flowchart of a virtual object control method according to one or more embodiments of the present disclosure.

FIG. 1 is a flowchart of a virtual object control method according to an embodiment of the present disclosure. The virtual object control method may be performed by a terminal. As shown in FIG. 1, the method may include the following several steps (110 to 140):

Step 110. Display a user interface.

The user interface may include a virtual object and a displacement control. The user interface may be an interface in a target application program. The user interface may be displayed in a display panel of the terminal on which the target application program is run, or the user interface or may be displayed in another display panel through screen mirroring by the terminal on which the target application program is run, or the user interface may be displayed through projection, or the user interface may be displayed through virtual reality (VR), augmented reality (AR), or another technology. The user interface display manner is not limited in the embodiments of the present disclosure. In certain embodiments, the user interface includes a first view layer and a second view layer. A view layer is a layer used for displaying content of the user interface. A display level of the first view layer is higher than that of the second view layer, that is to say, the first view layer is located above the second view layer. The first view layer may be used for displaying operation controls for the user to perform man-machine interaction, and the second view layer may be used for displaying a virtual environment picture. Because the display level of the first view layer is higher than that of the second view layer, the operation control is displayed at an upper layer of the virtual environment picture. In this way, it can be ensured that the operation controls respond to a touch operation of the user in time. Although the first view layer is located above the second view layer, the first view layer may not block display of content in the second view layer. For example, some or all of the operation controls in the first view layer may be displayed in a translucent state.

A virtual object is a virtual character controlled by a user account in an application. For example, the application is a game application. The virtual object is a game character controlled by the user account in the game application. The virtual object may be in a human form, an animal form, a cartoon form, or another form, and morphology of the virtual object is not limited in this embodiment of the present disclosure. The virtual object may be presented in a three-dimensional form or a two-dimensional form, and the presentation form of the virtual object is not limited in this embodiment of the present disclosure. The displacement control may be a virtual control used for controlling the virtual object to perform a displacement operation. In certain embodiments, the displacement control is a displacement skill control, and the displacement skill control is a control used for controlling the virtual object to cast a displacement skill. The virtual object may own at least one skill, for example, a displacement skill, an attack skill, or a cure skill, and the user may trigger the displacement skill of the virtual object through the displacement skill control, to cause the virtual object to perform a corresponding displacement operation. In certain embodiments, the displacement control may be a button, or may be a virtual joystick, and an implementation of the displacement control is not limited in this embodiment of the present disclosure.

The user interface may further display a virtual environment picture, and the virtual environment picture is used for displaying a virtual environment of the target application program. The virtual environment is a scene displayed (or provided) when a client of the target application program (such as a game application) runs on the terminal. The virtual environment refers to a scene created for a virtual object to perform activities (such as game competition), such as a virtual road, a virtual building (for example, tower or wall), or a virtual map. The virtual environment may be a simulated environment of a real world, or may be a semi-simulated and semi-fictional environment, or may be a fictional environment. The virtual environment may be a two-dimensional virtual environment, a 2.5-dimensional virtual environment, or a three-dimensional virtual environment, and the form of the virtual environment is not limited in this embodiment of the present disclosure. In certain embodiments, when or in response to determining that the virtual environment in which the virtual object is located is a three-dimensional virtual environment, the virtual object may be a three-dimensional model created based on a three-dimensional technology. The virtual object has its own shape and size in the three-dimensional virtual environment, and occupies some space in the three-dimensional virtual environment.

Step 120. Receive a first operation signal corresponding to the displacement control.

The client may receive the first operation signal of the user acting on the displacement control. In certain embodiments, the first operation signal may be a click/tap operation signal, or may be a slide operation signal, or may be a touch and hold operation signal. This is not limited in the embodiments of the present disclosure.

Step 130. Control, based on the first operation signal, the virtual object to perform a first displacement operation.

After receiving the first operation signal, the client may determine the first displacement operation of the virtual object according to the first operation signal. In some embodiments, a displacement direction and a displacement distance of the first displacement operation are determined through the first operation signal; and the virtual object is controlled to perform the first displacement operation according to the displacement direction and the displacement distance of the first displacement operation. In some other embodiments, a displacement direction of the first displacement operation is determined through the first operation signal; and the virtual object is controlled to perform the first displacement operation according to the displacement direction of the first displacement operation, where the displacement distance of the first displacement operation may be a preset fixed value. In certain embodiments, after the client receives a stop signal corresponding to the first displacement operation, or an operation time corresponding to the first displacement operation ends, the virtual object is controlled to stop performing the first displacement operation, that is, the first displacement operation is performed.

In certain embodiments, the user interface displays a movement controlling control, and a movement operation that the virtual object is controlled through the movement controlling control to perform is referred to as a regular movement operation. An average displacement speed of the virtual object when performing a displacement operation is greater than a movement speed of the virtual object when performing a regular movement operation. The regular movement operation of the virtual object does not belong to skill operations of the virtual object. The displacement operation belongs to the skill operations of the virtual object.

In some embodiments, the first displacement operation is a uniform displacement, and a displacement speed of the first displacement operation may be designated times a normal movement speed. Schematically, the designated times may be 1.2 times, 1.3 times, 1.5 times, 1.8 times, 2 times, 2.5 times, 3 times, or the like, and a specific value of the displacement speed of the first displacement operation, that is, a value of the designated times may be set by a person skilled in the art or the user according to an actual situation. This is not limited in the embodiments of the present disclosure.

In some other embodiments, the first displacement operation is a non-uniform displacement. Schematically, the first displacement operation may be first an accelerating displacement, and then a uniform displacement; or first an accelerating displacement, and then a decelerating displacement; or first an accelerating displacement, then a uniform displacement, and then a decelerating displacement. The accelerating displacement may be a uniform accelerating displacement, and the decelerating displacement may be a uniform decelerating displacement.

Step 140. Control, in response to a second operation signal corresponding to the displacement control being received in a process of performing the first displacement operation by the virtual object, the virtual object to perform a second displacement operation based on the second operation signal after the first displacement operation is performed.

In the process in which the virtual object performs the first displacement operation, the client may receive the second operation signal of the user acting on the displacement control. In certain embodiments, the second operation signal may be a click/tap operation signal, or may be a slide operation signal, or may be a touch and hold operation signal. This is not limited in the embodiments of the present disclosure.

After the first displacement operation is performed, the client may control the virtual object to perform the second displacement operation according to the second operation signal. A start point position of the second displacement operation may be an end point position of the first displacement operation.

For an implementation of controlling the virtual object to perform the second displacement operation, reference may be made to the related content about controlling the virtual object to perform the first displacement operation in the step 130. Details are not described herein again.

In the technical solution provided in this embodiment of the present disclosure, in a process of performing a first displacement operation by a virtual object, a second displacement operation that the virtual object is controlled to perform after the first displacement operation is performed is determined. Compared with a situation that time is spent in determining the subsequent second displacement operation after the first displacement operation is performed, in the technical solutions provided in the embodiments of the present disclosure, the second displacement operation is determined by using time in this process in which the virtual object performs the first displacement operation, to save an interval time between executions of the first displacement operation and the second displacement operation, so that a seamless connection may be implemented between the first displacement operation and the second displacement operation, thereby improving efficiency at which the virtual object performs displacement operations, and further improving an interaction effect of a computer.

Figure 2:
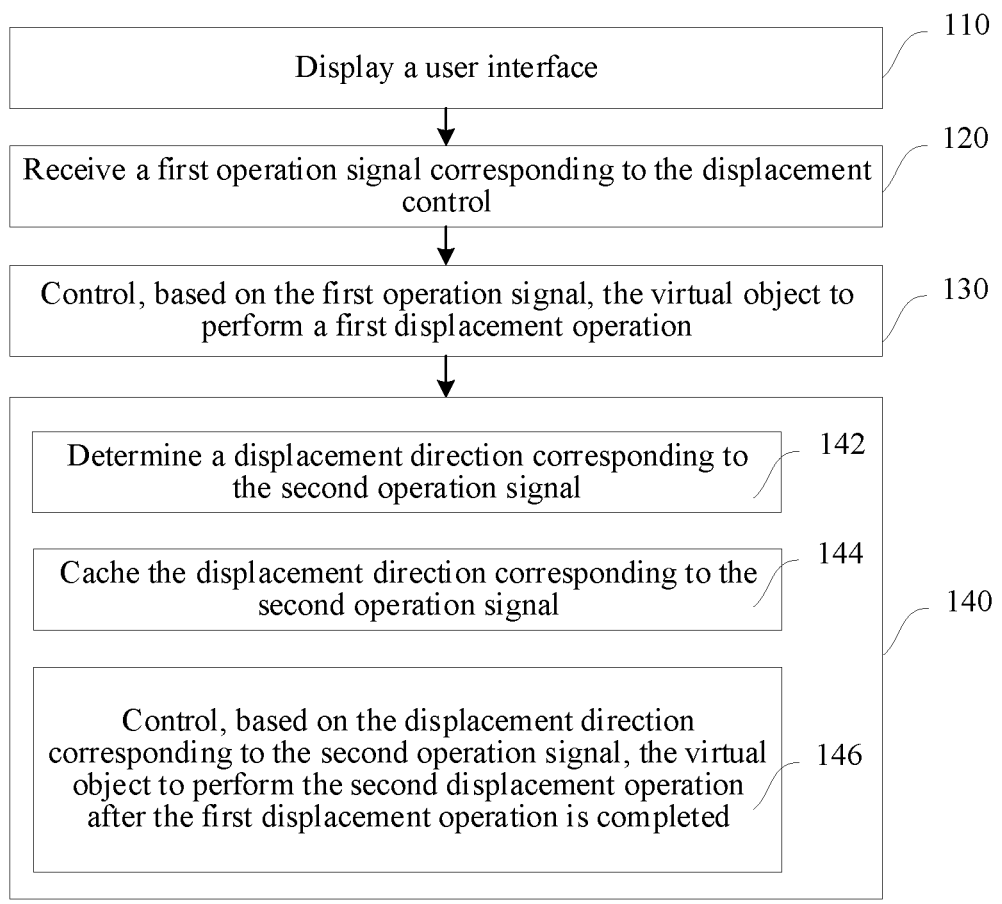
FIG. 2 is a schematic flowchart of a virtual object control method according to one or more embodiments of the present disclosure.

FIG. 2 is a flowchart of a virtual object control method according to another embodiment of the present disclosure. The method may be performed by a terminal. As shown in FIG. 2, the controlling, in response to a second operation signal corresponding to the displacement control being received in a process of performing the first displacement operation by the virtual object, the virtual object to perform a second displacement operation after the first displacement operation is performed (that is, the step 140) further includes the following steps (142 to 146):

Step 142. Determine a displacement direction corresponding to the second operation signal.

The client may determine the corresponding displacement direction according to the second operation signal. The displacement direction corresponding to the second operation signal is used for controlling the virtual object to perform the second displacement operation.

Figure 3:
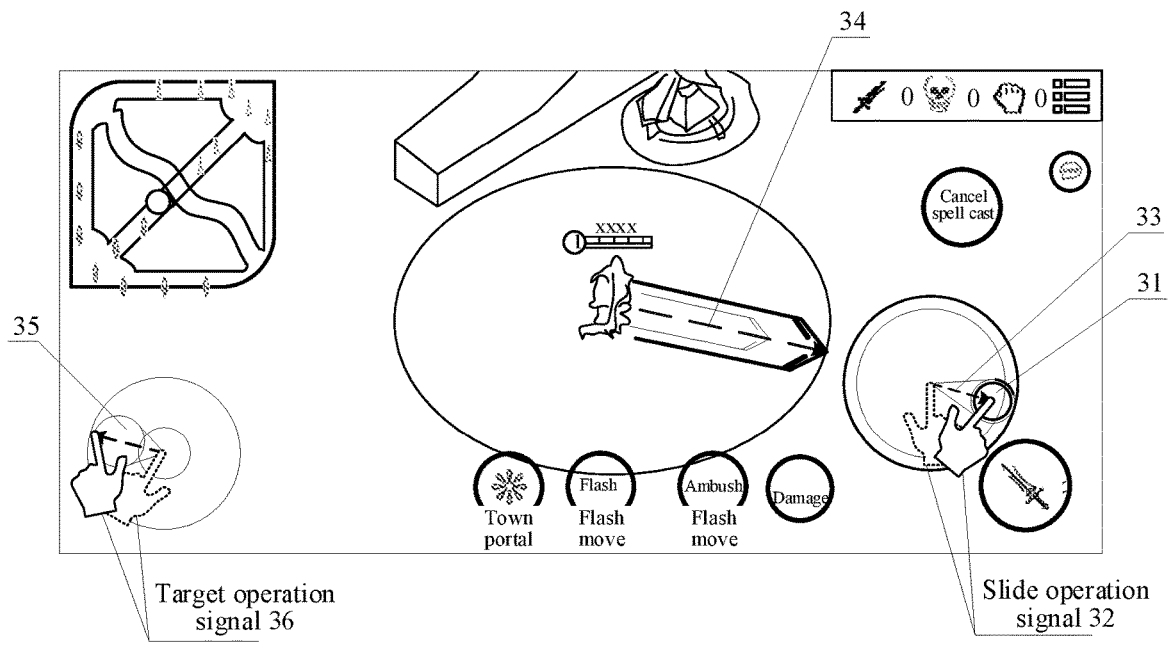
FIG. 3 to FIG. 6 are schematic diagrams of user interfaces according to one or more embodiments of the present disclosure.

In an example, as shown in FIG. 3, in response to the second operation signal being a slide operation signal 32 corresponding to a displacement control 31, a displacement direction 34 corresponding to the second operation signal is determined according to a slide direction 33 of the second operation signal. That is to say, when or in response to determining that only the slide operation signal 32 corresponding to the displacement control 31 is received, the second operation signal is the slide operation signal 32 corresponding to the displacement control 31; and when or in response to determining that the slide operation signal 32 corresponding to the displacement control 31 and a target operation signal 36 corresponding to a movement controlling control 35 are both received, the second operation signal is still the slide operation signal 32 corresponding to the displacement control 31.

Figure 4:
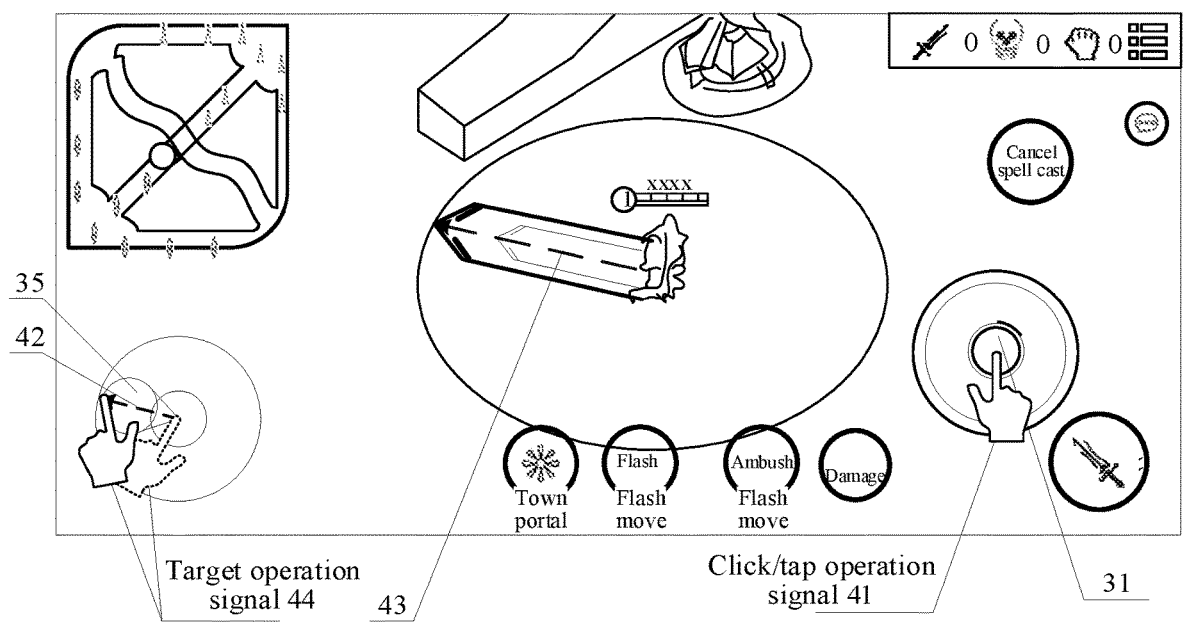

In another example, as shown in FIG. 4, in response to the second operation signal being a click/tap operation signal 41 corresponding to the displacement control 31 and a target operation signal 44 corresponding to a movement controlling control 35 being further received when or in response to determining that the second operation signal is received, it is determined according to direction information 42 of the target operation signal 44 that the second operation signal 43 corresponding to the displacement direction is a direction indicated by the direction information 42 corresponding to the target operation signal 44. The target operation signal may be a slide operation signal for the movement controlling control 35. In certain embodiments, the target operation signal may alternatively be a click/tap operation signal for the movement controlling control 35, and the displacement direction may be determined according to a click/tap position of the click/tap operation signal. For example, the displacement direction is determined according to a relative position relationship between the click/tap position and the center of the movement controlling control 35. In another example, on a circumference with the center of the movement controlling control 35 as a center of a circle, option controls for providing several directions (for example, 4 directions, 8 directions, or 16 directions) are displayed, and by triggering a target direction option control of the option controls, a direction corresponding to the target direction option control is determined as a displacement direction. A direction option control may be an arrow representing a corresponding direction, and may alternatively be a button displayed in a corresponding direction.

Figure 5:
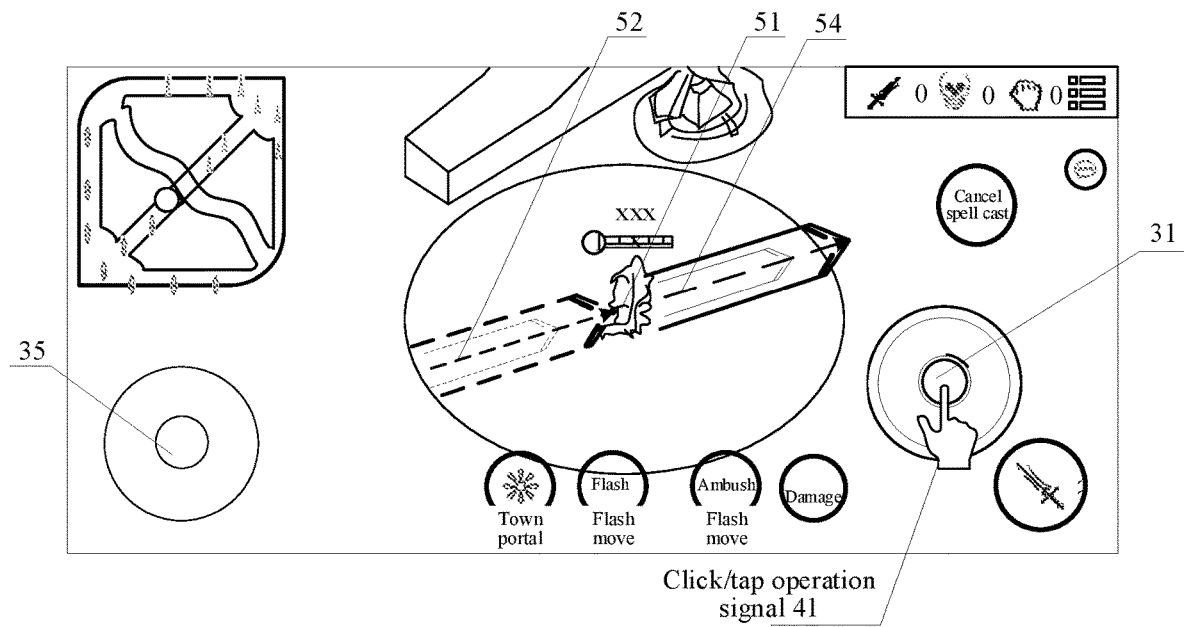
Figure 6:
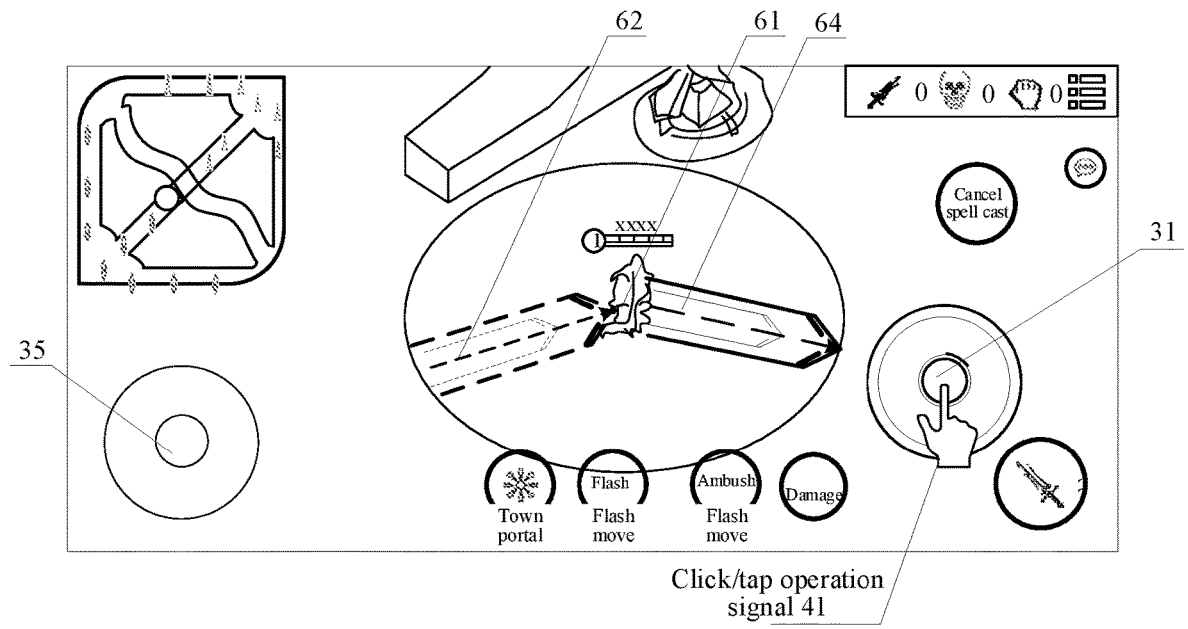

In still another example, as shown in FIG. 5, in response to the second operation signal being the click/tap operation signal 41 corresponding to the displacement control 31 and the target operation signal corresponding to the movement controlling control 35 having not been received when or in response to determining that the second operation signal is received, a default direction is determined as a displacement direction 54 corresponding to the second operation signal, the default direction being an orientation of the virtual object when or in response to determining that the virtual object 51 performs the first displacement operation. In certain embodiments, in the process of performing the first displacement operation, the orientation of the virtual object 51 is the displacement direction 52 corresponding to the first displacement operation; after the first displacement operation is performed, when or in response to determining of receiving no direction adjusting instruction of the user, the orientation of the virtual object is not changed, that is to say, the displacement direction 54 and the displacement direction 52 are kept consistent. In some embodiments, when performing the first displacement operation, the orientation of the virtual object is changed, and the displacement direction corresponding to the second displacement operation may be an orientation of the virtual object when receiving the second operation signal, or may be an orientation of the virtual object when completing the first displacement operation. Using an example in which the displacement direction corresponding to the second displacement operation is an orientation of the virtual object when completing the first displacement operation, as shown in FIG. 6, in the process of performing the first displacement operation, an orientation of a virtual object 61 is converted from a displacement direction 62 corresponding to the first displacement operation into a displacement direction 64. When the second displacement operation is performed, the virtual object is controlled to cast a displacement skill along the displacement direction 64. The change in the orientation of the virtual object when performing the first displacement operation may be caused by a touch operation performed by the user on the movement controlling control 35 during the first displacement operation.

Step 144. Cache the displacement direction corresponding to the second operation signal.

After the displacement direction corresponding to the second operation signal is determined, the displacement direction corresponding to the second operation signal may be cached in a local storage unit of the terminal, to be used for the following steps. In certain embodiments, in the process in which the virtual object performs the first displacement operation, the client may receive a plurality of operation signals based on the displacement control, and the client may cache a displacement direction corresponding to each operation signal in a cache queue. For example, when receiving new operation signals, the client replaces the originally cached displacement directions in the cache queue with displacement directions corresponding to the new operation signals, so that the displacement directions in the cache queue remain as displacement directions corresponding to latest operation signals. Alternatively, In certain embodiments, the client sequentially caches the displacement directions corresponding to the operation signals in the cache queue, and obtains, after completing a previous displacement operation, a displacement direction on a foremost position in the cache queue as a displacement direction when or in response to determining that the client controls the virtual object to perform a next displacement operation.

In some embodiments, after the displacement direction corresponding to the second operation signal is cached, in response to a caching duration of the displacement direction corresponding to the second operation signal reaching a set duration, the displacement direction corresponding to the second operation signal is deleted; or in response to the displacement direction corresponding to the second operation signal being used, the displacement direction corresponding to the second operation signal is deleted.

For the displacement direction corresponding to the second operation signal, the client presets the corresponding set duration. The caching duration is a duration for which the displacement direction corresponding to the second operation signal has been cached, and the set duration is a maximum duration for which the displacement direction corresponding to the second operation signal is allowed to be cached. After the caching duration reaches the set duration, or the displacement direction corresponding to the second operation signal is used, the client may delete the displacement direction corresponding to the second operation signal, to save cache resources, and ensure effectiveness and accuracy of cached content.

The set duration may be equal to a duration corresponding to the first displacement operation, or may be less than the duration corresponding to the first displacement operation. When the set duration is less than the duration corresponding to the first displacement operation, the set duration may be a designated proportion of the duration corresponding to the first displacement operation. Schematically, the designated proportion may be 80%, 60%, 50%, 30%, or the like, and a relationship between the set duration and the designated proportion of the duration corresponding to the first displacement operation may be set by a person skilled in the art or the user according to an actual situation. This is not limited in the embodiments of the present disclosure.

Step 146. Control, based on the displacement direction corresponding to the second operation signal, the virtual object to perform the second displacement operation after the first displacement operation is performed.

Figure 7:
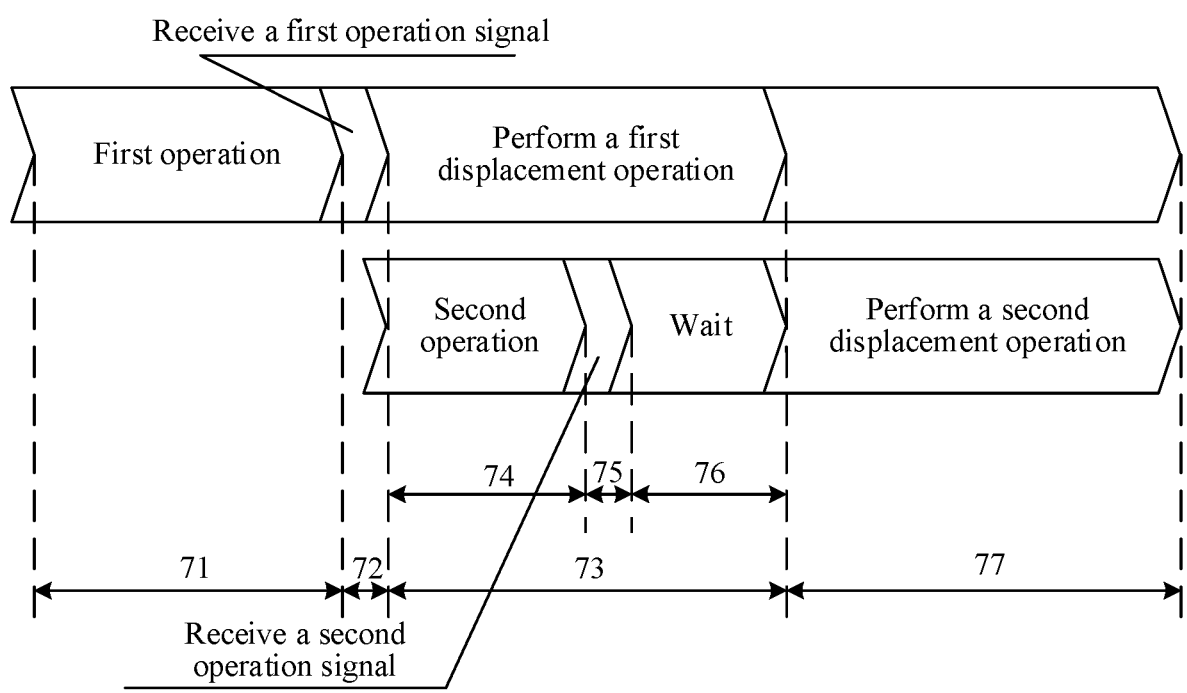
FIG. 7 is a schematic diagram of a displacement operation according to one or more embodiments of the present disclosure.

Using an example in which the second operation signal is an operation signal generated based on a displacement operation received most recently by the client when the virtual object performs the first displacement operation, as shown in FIG. 7, in a time period 71, a first operation signal is generated based on a first operation of a user. In a time period 72, the client receives the first operation signal. In a time period 73, the virtual object performs the first displacement operation according to the first operation signal. The time period 73 includes time sub-periods 74, 75, and 76. In the time sub-period 74, a second operation signal is generated based on a second operation of the user. In the time sub-period 75, the client receives the second operation signal. In the time sub-period 76, when or in response to determining that the client has not received an operation signal related to a displacement operation of the virtual object, the client keeps the second operation signal. In the time sub-period 76, when or in response to determining that the client has received an operation signal related to a displacement operation of the virtual object, the client updates the second operation signal. After the virtual object performs the first displacement operation according to the first operation signal, in a time period 77, the virtual object performs the second displacement operation according to the second operation signal. Through the method, after the first displacement operation is performed, the virtual object may immediately perform the second displacement operation according to the second operation signal, so that there is no interval time between the time period 73 corresponding to the first displacement operation and the time period 77 corresponding to the second displacement operation, thereby improving operation efficiency of controlling the virtual object to perform a displacement.

In some embodiments, the method further includes the following steps:

1. Determine, in response to a third operation signal corresponding to the displacement control being received in the process of performing the first displacement operation by the virtual object, a displacement direction corresponding to the third operation signal after the displacement direction corresponding to the second operation signal is cached.
2. Delete the cached displacement direction corresponding to the second operation signal, and cache the displacement direction corresponding to the third operation signal.

In the process in which the virtual object performs the first displacement operation, after receiving the second operation signal, the client further receives the third operation signal corresponding to the displacement control, indicating that the user intends that the virtual object performing, after completing the first displacement operation, the third displacement operation corresponding to the third operation signal, instead of performing the second displacement operation. Therefore, the displacement direction corresponding to the third operation signal may be determined according to the third operation signal, and the cached displacement direction corresponding to the second operation signal is replaced with the displacement direction corresponding to the third operation signal, thereby updating a subsequent displacement operation of the virtual object after completing the first displacement operation, and improving accuracy of controlling the virtual object to perform displacement operations.

In the implementation, a displacement direction determining mechanism is provided, where when direction information is inputted to both the movement controlling control and the displacement control, the displacement direction of the virtual object is determined preferentially according to the direction information corresponding to displacement control, to resolve a direction information conflict problem; and when there is only the click/tap operation for the displacement control, an orientation of the virtual object is determined as the displacement direction, to simplify operations of the user.

In some embodiments, the method further includes the following steps:

1. Detect, before the controlling, in response to a second operation signal corresponding to the displacement control being received in a process of performing the first displacement operation by the virtual object, the virtual object to perform a second displacement operation based on the second operation signal after the first displacement operation is performed, whether the virtual object meets a condition of performing the second displacement operation, where the condition includes at least one of the following: the displacement direction corresponding to the second operation signal being a movable direction, the virtual object being in a displaceable state, and a quantity of virtual resources owned by the virtual object being greater than or equal to a resource threshold corresponding to the second displacement operation.

2. Control, in response to the virtual object meeting the condition and the second operation signal corresponding to the displacement control being received in the process of performing the first displacement operation by the virtual object, the virtual object to perform the second displacement operation based on the second operation signal after the first displacement operation is performed.

In certain embodiments, when the virtual object does not meet the condition, the virtual object does not perform the second displacement operation.

In certain embodiments, when no displacement obstacle element exists in the displacement direction corresponding to the second operation signal, the displacement direction corresponding to the second operation signal is determined as the movable direction. The displacement obstacle element is an element that is set in the virtual scene and through which the virtual object cannot pass, and the displacement obstacle element may include a terrain through which the virtual object cannot pass (for example, a high mountain, a high slope, a trench, or a cliff), an obstacle (for example, a stone, a wall, or a tree), another virtual object (for example, a friendly virtual object, a hostile virtual object, or a virtual object not controlled by the user), and a barrier obstacle that is cast by another virtual object and that is used for limiting movement of the virtual object, and the like.

That the virtual object is in the movable state includes that the use of the displacement skill of the virtual object is not limited. That the use of the displacement skill of the virtual object is limited includes: the virtual object is using a skill in conflict with the displacement skill, the displacement of the virtual object is limited by a skill of another virtual object (for example, the virtual object is limited to an original place by a skill cast by another virtual object or a movement speed becomes slow), the displacement skill of the virtual object is in a cool-down time, the virtual object is located in a carrier, the virtual object is in a death state, and the like.

In some possible embodiments, the performing the displacement operation by the virtual object may need to consume a resource threshold quantity of virtual resources (for example, virtual currencies, or virtual props), and when the quantity of virtual resources owned by the virtual object is greater than or equal to the required resource threshold, it is determined that the virtual object is likely to meet the condition of performing the second displacement operation; and when the quantity of virtual resources owned by the virtual object is less than the required resource threshold, it is determined that the virtual object does not meet the condition of performing the second displacement operation.

In the implementation, by setting a condition for the second displacement operation of the virtual object, and detecting whether the virtual object meets the condition of performing the second displacement operation, when the virtual object meets the condition, the virtual object is controlled to perform the second displacement operation; and compared with a control manner in which as long as the user performs a corresponding operation, the virtual object can perform a corresponding displacement operation, the virtual object control method is enriched.

Figure 8:
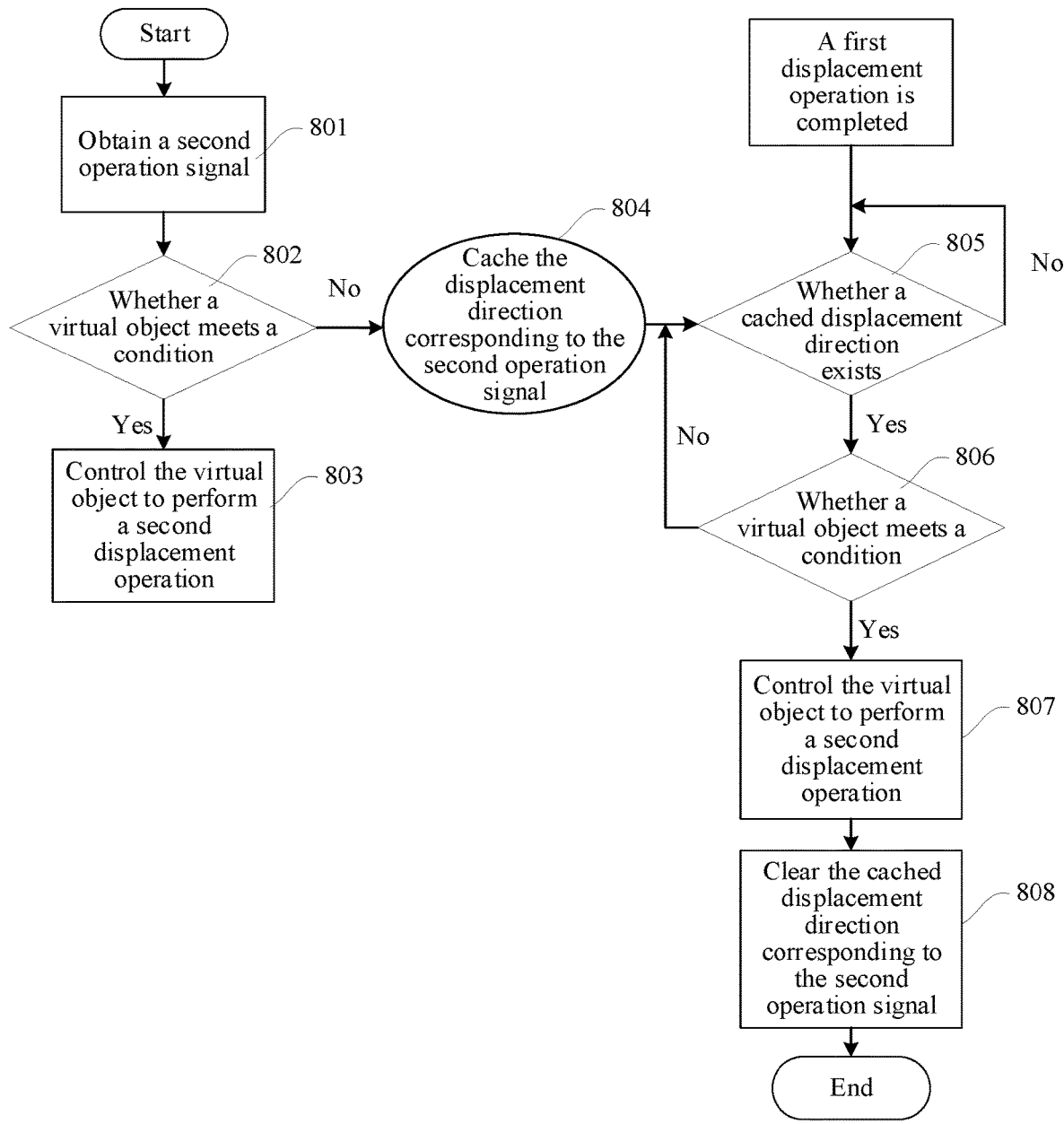
FIG. 8 is a schematic flowchart of a virtual object control method according to one or more embodiments of the present disclosure.

FIG. 8 is a flowchart of a virtual object control method according to another embodiment of the present disclosure. As shown in FIG. 8, the method may include the following steps (801 to 808):

Step 801. Obtain a second operation signal.

Step 802: Determine whether a virtual object meets a condition. Step 803 is performed if yes; and step 804 is performed if not.

Step 803. Control the virtual object to perform a second displacement operation.

Step 804. Cache a displacement direction corresponding to the second operation signal.

Step 805. Determine, in response to a first displacement operation being performed, whether a cached displacement direction exists. Step 806 is performed if yes; and step 805 continues to be performed if not.

Step 806: Determine whether a virtual object meets a condition. Step 807 is performed if yes; and step 805 is performed if not.

Step 807. Control the virtual object to perform a second displacement operation.

Step 808. Clear the cached displacement direction corresponding to the second operation signal.

Figure 9:
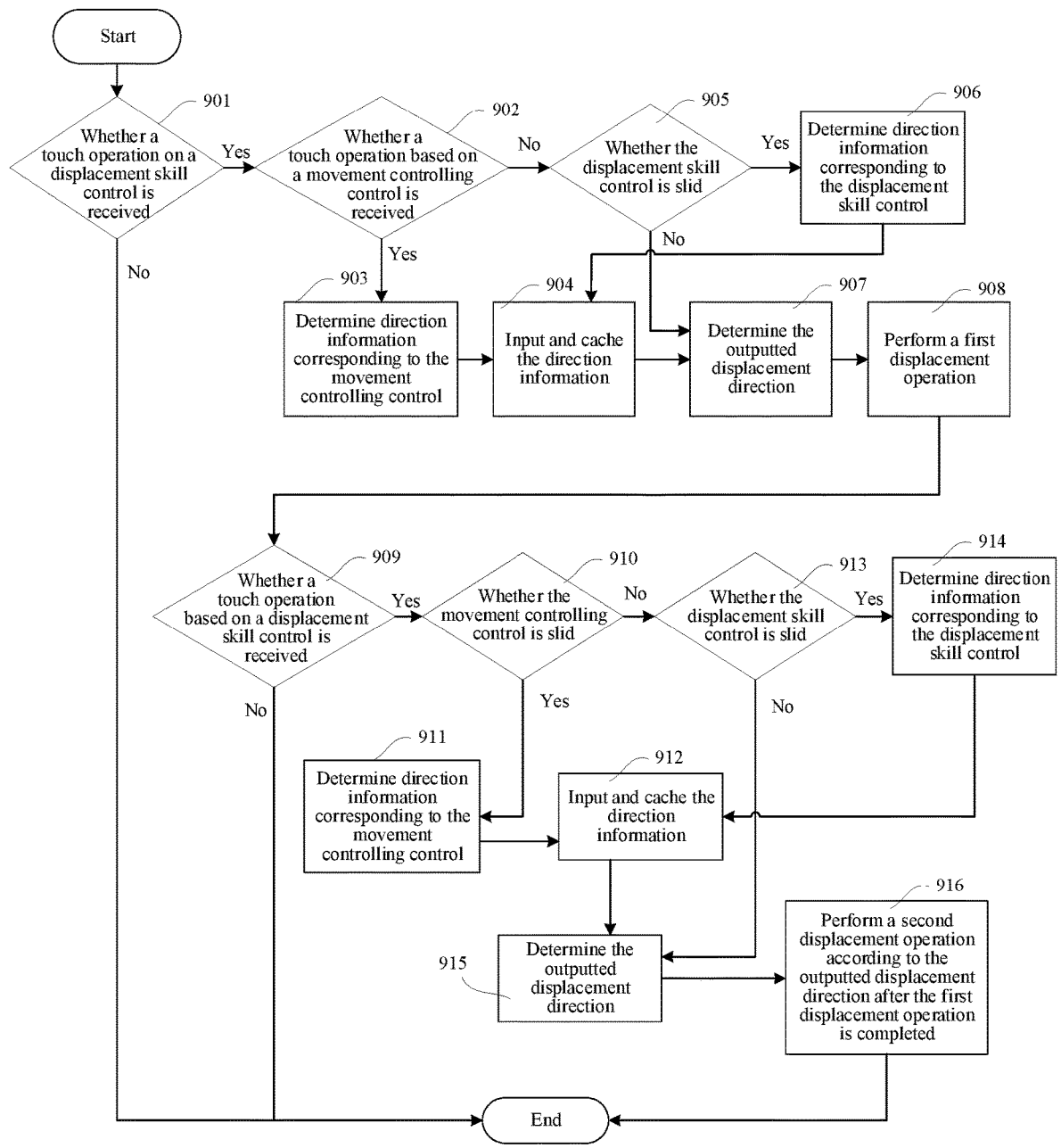
FIG. 9 is a schematic flowchart of a virtual object control method according to one or more embodiments of the present disclosure.

FIG. 9 is a flowchart of a virtual object control method according to another embodiment of the present disclosure. As shown in FIG. 9, the method may include the following steps (901 to 916):

Step 901. Determine whether a touch operation on a displacement skill control is received. Step 902 is performed if yes; and steps end if not.

Step 902. Determine whether a touch operation based on a movement controlling control is received. Step 903 is performed if yes; and step 905 is performed if not.

Step 903. Determine direction information corresponding to the movement controlling control.

Step 904. Input and cache the direction information.

Step 905. Detect whether the displacement skill control is slid. Step 906 is performed if yes; and step 907 is performed if not.

Step 906. Determine direction information corresponding to the displacement skill control, and perform step 904.

Step 907. Determine an outputted displacement direction according to the inputted and cached direction information.

Step 908. Perform a first displacement operation.

Step 909. Determine whether a touch operation based on the displacement skill control is received. Step 910 is performed if yes; and steps end if not.

Step 910. Detect whether the movement controlling control is slid. Step 911 is performed if yes; and step 913 is performed if not.

Step 911. Determine direction information corresponding to the movement controlling control.

Step 912. Input and cache the direction information.

Step 913. Detect whether the displacement skill control is slid. Step 914 is performed if yes; and step 915 is performed if not.

Step 914. Determine direction information corresponding to the displacement skill control, and perform step 912.

Step 915. Determine an outputted displacement direction according to the inputted and cached direction information.

Step 916. Perform a second displacement operation according to the outputted displacement direction after the first displacement operation is performed. Steps end.

The following is an apparatus embodiment of the present disclosure, which can be used to execute the method embodiments of the present disclosure. For details not disclosed in the apparatus embodiments of the present disclosure, reference is made to the method embodiments of the present disclosure.

Figure 10:
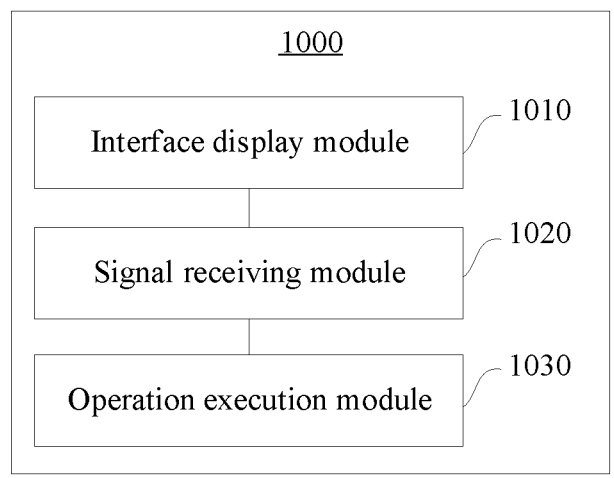
FIG. 10 is a schematic block diagram of a virtual object control apparatus according to one or more embodiments of the present disclosure.

FIG. 10 is a block diagram of a virtual object control apparatus according to an embodiment of the present disclosure. The apparatus has a function of implementing the virtual object control method examples, and the function may be implemented by hardware or by hardware executing corresponding software. The apparatus may be the terminal described herein, or may be disposed on the terminal. The apparatus 1000 may include: an interface display module 1010, a signal receiving module 1020, and an operation execution module 1030.

The interface display module 1010 is configured to display a user interface, the user interface including a virtual object and a displacement control; and the displacement control being used for controlling the virtual object to cast a displacement skill.

The signal receiving module 1020 is configured to receive a first operation signal corresponding to the displacement control.

The operation execution module 1030 is configured to control, based on the first operation signal, the virtual object to perform a first displacement operation.

The operation execution module 1030 is further configured to control, in response to a second operation signal corresponding to the displacement control being received by the signal receiving module 1020 in a process of performing the first displacement operation by the virtual object, the virtual object to perform a second displacement operation based on the second operation signal after the first displacement operation is performed.

In certain embodiments, the operation execution module 1030 includes: a direction determining sub-module, configured to determine, in response to the second operation signal corresponding to the displacement control being received in the process of performing the first displacement operation by the virtual object, a displacement direction corresponding to the second operation signal; a direction caching sub-module, configured to cache the displacement direction corresponding to the second operation signal; and an operation execution sub-module, configured to control, based on the displacement direction corresponding to the second operation signal, the virtual object to perform the second displacement operation after the first displacement operation is performed.

In certain embodiments, the direction determining sub-module is configured to: determine, in response to the second operation signal being a slide operation signal corresponding to the displacement control, the displacement direction corresponding to the second operation signal according to a slide direction of the second operation signal; determine, in response to the second operation signal being a click/tap operation signal corresponding to the displacement control and a target operation signal corresponding to a movement controlling control being further received when or in response to determining that the second operation signal is received, the displacement direction corresponding to the second operation signal according to direction information of the target operation signal; and determine, in response to the second operation signal being the click/tap operation signal corresponding to the displacement control and the target operation signal corresponding to the movement controlling control having not been received when or in response to determining that the second operation signal is received, a default direction as the displacement direction corresponding to the second operation signal, the default direction being an orientation of the virtual object when or in response to determining that the virtual object performs the first displacement operation.

In certain embodiments, the direction caching sub-module is further configured to delete, in response to a caching duration of the displacement direction corresponding to the second operation signal reaching a set duration, the displacement direction corresponding to the second operation signal; or delete, in response to the displacement direction corresponding to the second operation signal being used, the displacement direction corresponding to the second operation signal.

In certain embodiments, the direction determining sub-module is further configured to determine, in response to a third operation signal corresponding to the displacement control being received by the signal receiving module 1020 in the process of performing the first displacement operation by the virtual object, a displacement direction corresponding to the third operation signal; and the direction caching sub-module is further configured to delete the cached displacement direction corresponding to the second operation signal, and cache the displacement direction corresponding to the third operation signal.

In certain embodiments, the apparatus further includes: a condition detection module, configured to detect, after the first displacement operation is performed, whether the virtual object meets a condition of performing the second displacement operation, where the condition includes at least one of the following: the displacement direction corresponding to the second operation signal being a movable direction, the virtual object being in a displaceable state, and a quantity of virtual resources owned by the virtual object being greater than or equal to a resource threshold corresponding to the second displacement operation; and the operation execution module 1030 is configured to control, in response to the virtual object meeting the condition and the second operation signal corresponding to the displacement control being received in the process of performing the first displacement operation by the virtual object, the virtual object to perform the second displacement operation based on the second operation signal after the first displacement operation is performed.

In the technical solution provided in this embodiment of the present disclosure, in a process of performing a first displacement operation by a virtual object, a second displacement operation that the virtual object is controlled to perform after the first displacement operation is performed is determined. Compared with a situation that time is spent in determining the subsequent second displacement operation after the first displacement operation is performed, in the technical solutions provided in the embodiments of the present disclosure, the second displacement operation is determined by using time in this process in which the virtual object performs the first displacement operation, to save an interval time between the first displacement operation and the second displacement operation, so that a seamless connection may be implemented between the first displacement operation and the second displacement operation, thereby improving efficiency at which the virtual object performs displacement operations, and further improving an interaction effect of a computer.

When the apparatus provided in the embodiment implements the functions of the apparatus, only division of the function modules is used as an example for description. In the practical implementation, the functions may be allocated to and performed by different function modules according to requirements. That is, an internal structure of the device is divided into different function modules, to perform all or some of the functions described herein. In addition, the apparatus and method embodiments provided in the embodiments belong to the same conception. For the specific implementation process, reference may be made to the method embodiments, and details are not described herein again.

Figure 11:
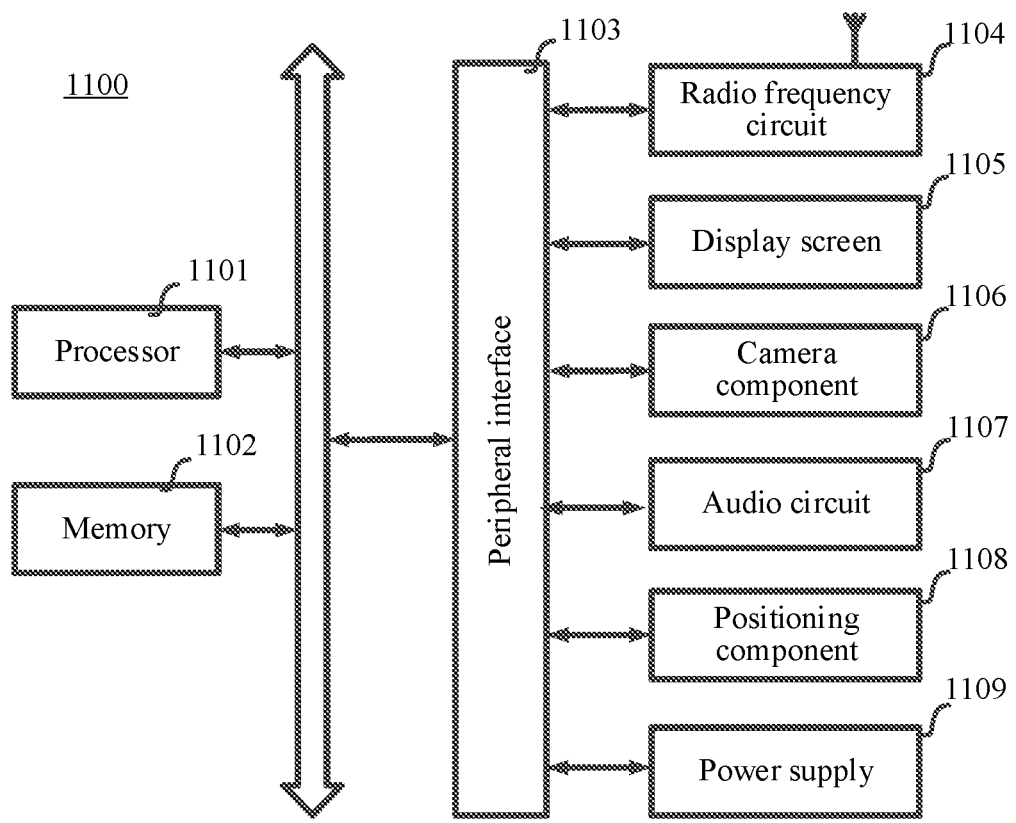
FIG. 11 is a schematic block diagram of a terminal according to one or more embodiments of the present disclosure.

FIG. 11 is a structural block diagram of a terminal 1100 according to an embodiment of the present disclosure. The terminal 1100 may be an electronic device such as a mobile phone, a tablet computer, a game console, an ebook reader, a multimedia player, a wearable device, or a PC. The terminal is configured to implement the virtual object control method provided in the embodiments. Specifically:

Generally, the terminal 1100 includes a processor 1111 and a memory 1112.

The processor 1101 may include one or more processing cores, for example, a 4-core processor or an 8-core processor. The processor 1101 may be implemented in at least one hardware form of a digital signal processor (DSP), a field-programmable gate array (FPGA), and a programmable logic array (PLA). The processor 1101 may alternatively include a main processor and a coprocessor. The main processor is configured to process data in an awake state, also referred to as a central processing unit (CPU); and the coprocessor is a low-power processor configured to process data in a standby state. In some embodiments, the processor 1101 may be integrated with a graphics processing unit (GPU). The GPU is configured to render and draw content that may need to be displayed on a display screen. In some embodiments, the processor 1101 may further include an artificial intelligence (AI) processor. The AI processor is configured to process a calculation operation related to machine learning.

The memory 1102 may include one or more computer-readable storage media. The computer-readable storage medium may be non-transient. The memory 1102 may further include a high-speed random access memory and a non-volatile memory such as one or more magnetic disk storage devices and a flash storage device. In some embodiments, the non-transient computer-readable storage medium in the memory 1102 is configured to store a computer program, the computer program being configured to be executed by one or more processors to implement the virtual object control method.

In some embodiments, the terminal 1100 may include a peripheral interface 1103 and at least one peripheral. The processor 1101, the memory 1102, and the peripheral interface 1103 may be connected through a bus or a signal cable. Each peripheral may be connected to the peripheral interface 1103 through a bus, a signal cable, or a circuit board. Specifically, the peripheral includes at least one of a radio frequency circuit 1104, a display screen 1105, a camera assembly 1106, an audio circuit 1107, a positioning assembly 1108, and a power supply 1109.

A person skilled in the art may understand that the structure shown in FIG. 11 does not constitute a limitation on the terminal 1100, and the terminal may include more or fewer components than those shown in the figure, or some components may be combined, or a different component deployment may be used.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

In some embodiments, a computer-readable storage medium is further provided, storing at least one computer program, the computer program being loaded and executed by a processor to implement all or some steps of the virtual object control method.

In some embodiments, a computer program product or a computer program is further provided. The computer program product or the computer program includes computer instructions, and the computer instructions are stored in a computer-readable storage medium. A processor of the computer device reads the computer instructions from the computer-readable storage medium and executes the computer instructions to cause the computer device to perform all or some steps of the virtual object control method provided in the method embodiments.

After considering the present disclosure, a person skilled in the art will easily conceive of other implementations of the present disclosure. The present disclosure is intended to cover any variation, use, or adaptive change of the present disclosure. These variations, uses, or adaptive changes follow the general principles of the present disclosure and include common general knowledge or common technical means in the art that are not disclosed in the present disclosure. Embodiments of the present disclosure are considered as merely exemplary, and the real scope and spirit of the present disclosure are pointed out in the following claims.

The present disclosure is not limited to the precise structures described herein and shown in the accompanying drawings, and various modifications and changes can be made without departing from the scope of the present disclosure. The scope of the present disclosure is limited only by the appended claims.

What is claimed is:

1. A virtual object control method, performed by a terminal, and the method comprising:
    displaying a user interface, the user interface including a virtual object, a movement controlling control, and a displacement control; and the displacement control being used for controlling the virtual object to cast a displacement skill;
    receiving a first operation signal corresponding to the displacement control;
    controlling, based on the first operation signal, the virtual object to perform a first displacement operation, wherein the first displacement operation is configured to control the virtual object to perform a target movement at an average speed different from a speed of a regular movement triggered by the movement controlling control; and
    controlling, in response to a second operation signal corresponding to the displacement control being received in a process of performing the first displacement operation by the virtual object, the virtual object to finish performing the first displacement operation and to perform a second displacement operation based on the second operation signal after the first displacement operation is completed, wherein a start point position of the second displacement operation is an end point position of the first displacement operation.

2. The method according to claim 1, wherein controlling the virtual object to perform the second displacement operation comprises:

determining, in response to the second operation signal corresponding to the displacement control being received in the process of performing the first displacement operation by the virtual object, a displacement direction corresponding to the second operation signal;
caching the displacement direction corresponding to the second operation signal; and
controlling, based on the displacement direction corresponding to the second operation signal, the virtual object to perform the second displacement operation after the first displacement operation is performed.

3. The method according to claim 2, wherein determining the displacement direction corresponding to the second operation signal comprises:
determining, in response to the second operation signal being a slide operation signal corresponding to the displacement control, the displacement direction corresponding to the second operation signal according to a slide direction of the second operation signal;
determining, in response to the second operation signal being a click/tap operation signal corresponding to the displacement control and a target operation signal corresponding to the movement controlling control being further received when or in response to determining that the second operation signal is received, the displacement direction corresponding to the second operation signal according to direction information of the target operation signal; and
determining, in response to the second operation signal being the click/tap operation signal corresponding to the displacement control and the target operation signal corresponding to the movement controlling control having not been received when or in response to determining that the second operation signal is received, a default direction as the displacement direction corresponding to the second operation signal, the default direction being an orientation of the virtual object when or in response to determining that the virtual object performs the first displacement operation.

4. The method according to claim 2, further comprising:
deleting, in response to a caching duration of the displacement direction corresponding to the second operation signal reaching a set duration, the displacement direction corresponding to the second operation signal.

5. The method according to claim 2, further comprising:
deleting, in response to the displacement direction corresponding to the second operation signal being used, the displacement direction corresponding to the second operation signal.

6. The method according to claim 2, further comprising:
determining, in response to a third operation signal corresponding to the displacement control being received in the process of performing the first displacement operation by the virtual object, a displacement direction corresponding to the third operation signal; and
deleting the cached displacement direction corresponding to the second operation signal, and caching the displacement direction corresponding to the third operation signal.

7. The method according to claim 1, further comprising:
detecting whether the virtual object meets a condition of performing the second displacement operation, wherein the condition includes at least one of the following: the displacement direction corresponding to the second operation signal being a movable direction, the virtual object being in a displaceable state, and a quantity of virtual resources owned by the virtual object being greater than or equal to a resource threshold corresponding to the second displacement operation; and controlling the virtual object to perform the second displacement operation comprises:
controlling, in response to the virtual object meeting the condition and the second operation signal corresponding to the displacement control being received in the process of performing the first displacement operation by the virtual object, the virtual object to perform the second displacement operation based on the second operation signal after the first displacement operation is performed.

8. The method according to claim 1, wherein controlling the virtual object to perform the second displacement operation comprises:
determining, in response to the second operation signal being a click/tap operation signal corresponding to the displacement control and a target operation signal corresponding to the movement controlling control having not been received when the second operation signal is received, a default direction as a displacement direction corresponding to the second operation signal, the default direction being an orientation of the virtual object when the virtual object performs the first displacement operation; and
controlling, based on the displacement direction corresponding to the second operation signal, the virtual object to perform the second displacement operation after the first displacement operation is performed.

9. The method according to claim 1, further comprising:
in response to direction information indicated by the first displacement control or the second displacement control being different from direction information indicated by the movement controlling control, controlling the virtual object to move based on the direction information indicated by the first displacement control or the second displacement control.

10. A virtual object control apparatus, comprising: a memory storing computer program instructions; and a processor coupled to the memory and configured to execute the computer program instructions and perform:
displaying a user interface, the user interface including a virtual object, a movement controlling control, and a displacement control; and the displacement control being used for controlling the virtual object to cast a displacement skill;
receiving a first operation signal corresponding to the displacement control;
controlling, based on the first operation signal, the virtual object to perform a first displacement operation, wherein the first displacement operation is configured to control the virtual object to perform a target movement at an average speed different from a speed of a regular movement triggered by the movement controlling control;
controlling, in response to a second operation signal corresponding to the displacement control being received in a process of performing the first displacement operation by the virtual object, the virtual object to finish performing the first displacement operation and to perform a second displacement operation based on the second operation signal after the first displacement operation is completed, wherein a start point position of the second displacement operation is an end point position of the first displacement operation.

11. The apparatus according to claim 10, wherein controlling the virtual object to perform the second displacement operation includes:
determining, in response to the second operation signal corresponding to the displacement control being received in the process of performing the first displacement operation by the virtual object, a displacement direction corresponding to the second operation signal;
caching the displacement direction corresponding to the second operation signal; and
controlling, based on the displacement direction corresponding to the second operation signal, the virtual object to perform the second displacement operation after the first displacement operation is performed.

12. The apparatus according to claim 11, wherein determining the displacement direction corresponding to the second operation signal includes:
determining, in response to the second operation signal being a slide operation signal corresponding to the displacement control, the displacement direction corresponding to the second operation signal according to a slide direction of the second operation signal;
determining, in response to the second operation signal being a click/tap operation signal corresponding to the displacement control and a target operation signal corresponding to the movement controlling control being further received in response to determining that the second operation signal is received, the displacement direction corresponding to the second operation signal according to direction information of the target operation signal; and
determining, in response to the second operation signal being the click/tap operation signal corresponding to the displacement control and the target operation signal corresponding to the movement controlling control having not been received when or in response to determining that the second operation signal is received, a default direction as the displacement direction corresponding to the second operation signal, the default direction being an orientation of the virtual object in response to determining that the virtual object performs the first displacement operation.

13. The apparatus according to claim 11, wherein the processor is further configured to execute the computer program instructions and perform:
deleting, in response to a caching duration of the displacement direction corresponding to the second operation signal reaching a set duration, the displacement direction corresponding to the second operation signal.

14. The apparatus according to claim 11, wherein the processor is further configured to execute the computer program instructions and perform:
deleting, in response to the displacement direction corresponding to the second operation signal being used, the displacement direction corresponding to the second operation signal.

15. The apparatus according to claim 11, wherein the processor is further configured to execute the computer program instructions and perform:
determining, in response to a third operation signal corresponding to the displacement control being received in the process of performing the first displacement operation by the virtual object, a displacement direction corresponding to the third operation signal; and
deleting the cached displacement direction corresponding to the second operation signal, and cache the displacement direction corresponding to the third operation signal.

16. The apparatus according to claim 10, wherein the processor is further configured to execute the computer program instructions and perform:
detecting whether the virtual object meets a condition of performing the second displacement operation, wherein the condition includes at least one of the following: the displacement direction corresponding to the second operation signal being a movable direction, the virtual object being in a displaceable state, and a quantity of virtual resources owned by the virtual object being greater than or equal to a resource threshold corresponding to the second displacement operation; and
controlling, in response to the virtual object meeting the condition and the second operation signal corresponding to the displacement control being received in the process of performing the first displacement operation by the virtual object, the virtual object to perform the second displacement operation based on the second operation signal after the first displacement operation is performed.

17. A non-transitory computer-readable storage medium storing computer program instructions executable by at least one processor to perform:
displaying a user interface, the user interface including a virtual object, a movement controlling control, and a displacement control; and the displacement control being used for controlling the virtual object to cast a displacement skill;
receiving a first operation signal corresponding to the displacement control;
controlling, based on the first operation signal, the virtual object to perform a first displacement operation, wherein the first displacement operation is configured to control the virtual object to perform a target movement at an average speed different from a speed of a regular movement triggered by the movement controlling control; and
controlling, in response to a second operation signal corresponding to the displacement control being received in a process of performing the first displacement operation by the virtual object, the virtual object to finish performing the first displacement operation and to perform a second displacement operation based on the second operation signal after the first displacement operation is completed, wherein a start point position of the second displacement operation is an end point position of the first displacement operation.

18. The non-transitory computer-readable storage medium according to claim 17, wherein controlling the virtual object to perform the second displacement operation includes:
determining, in response to the second operation signal corresponding to the displacement control being received in the process of performing the first displacement operation by the virtual object, a displacement direction corresponding to the second operation signal;
caching the displacement direction corresponding to the second operation signal; and
controlling, based on the displacement direction corresponding to the second operation signal, the virtual object to perform the second displacement operation after the first displacement operation is performed.

19. The non-transitory computer-readable storage medium according to claim 18, wherein
determining the displacement direction corresponding to the second operation signal includes:
determining, in response to the second operation signal being a slide operation signal corresponding to the displacement control, the displacement direction corresponding to the second operation signal according to a slide direction of the second operation signal;
determining, in response to the second operation signal being a click/tap operation signal corresponding to the displacement control and a target operation signal corresponding to the movement controlling control being further received when or in response to determining that the second operation signal is received, the displacement direction corresponding to the second operation signal according to direction information of the target operation signal; and
determining, in response to the second operation signal being the click/tap operation signal corresponding to the displacement control and the target operation signal corresponding to the movement controlling control having not been received when or in response to determining that the second operation signal is received, a default direction as the displacement direction corresponding to the second operation signal, the default direction being an orientation of the virtual object when or in response to determining that the virtual object performs the first displacement operation.

20. The non-transitory computer-readable storage medium according to claim 18, wherein the computer program instructions are executable by the at least one processor to further perform at least one of:
deleting, in response to a caching duration of the displacement direction corresponding to the second operation signal reaching a set duration, the displacement direction corresponding to the second operation signal; or
deleting, in response to the displacement direction corresponding to the second operation signal being used, the displacement direction corresponding to the second operation signal.

\* \* \* \* \*